United States Patent [19]

Bickford et al.

[11] 4,231,454

[45] Nov. 4, 1980

[54] TORQUE WRENCH WITH CLUTCHES IN SERIES

[75] Inventors: John H. Bickford, Middletown; Robert F. Snyder, Hamden, both of Conn.

[73] Assignee: Raymond Engineering Inc., Middletown, Conn.

[21] Appl. No.: 923,906

[22] Filed: Jul. 12, 1978

[51] Int. Cl.[3] .................... B60K 41/24; F16D 67/02

[52] U.S. Cl. .................... 192/4 R; 192/12 B; 81/57.3; 29/240

[58] Field of Search .................... 81/57.3; 29/240; 192/12 B, 7, 4 R

[56] References Cited

U.S. PATENT DOCUMENTS

| | | | |
|---|---|---|---|
| 1,044,008 | 11/1912 | Boehck | 192/12 B |
| 2,523,878 | 9/1950 | Rataiczak | 192/12 B |
| 2,680,983 | 6/1954 | Miller | 81/57.3 |
| 3,258,999 | 7/1966 | Scheithauer et al. | 81/57.3 |

FOREIGN PATENT DOCUMENTS

| | | | |
|---|---|---|---|
| 1061418 | 3/1967 | United Kingdom | 192/12 B |

*Primary Examiner*—Lawrence J. Staab
*Attorney, Agent, or Firm*—Fishman and Van Kirk

[57] ABSTRACT

A torque wrench is presented having a pair of clutches in series. One clutch is a one way clutch, preferably reversible, which transmits the input force in one direction during torquing operations; and the second clutch provides friction restraint against movement in the opposite direction. When desired, force applied to the wrench in the opposite direction overcomes the friction clutches to release the wrench from the work.

13 Claims, 5 Drawing Figures

TORQUE WRENCH WITH CLUTCHES IN SERIES

BACKGROUND OF THE INVENTION (1) Field of the Invention

This invention relates to the field of torque wrenches. More particularly, this invention relates to the field of manually operated torque wrenches in which the potential for drive back or kick back through the wrench poses a hazard to the operator of the wrench.

(2) Description of the Prior Art

Torque wrenches are well known in the art in which spur or planetary gears are used to transmit and multiply an input force to the wrench to the output of the wrench for purposes of applying torque to a nut or bolt or other fastening element. As is well known in the art, when a torque wrench of this type is used to apply a desired torque to tighten a nut or bolt, an equal and opposite reaction is created on the wrench which, unless restrained, will drive back through the wrench and pose a serious kick back hazard to the operator. Unless this reaction force is restrained, as soon as the operator lets go of the input handle, the input handle will be driven violently in the opposite direction (i.e., opposite from the direction in which it was being moved to apply torque), thereby posing a serious kick back hazard. In the past, the traditional approach to this problem has been to use a ratchet mechanism between input handle of the wrench and the gear train to prevent kick back. The ratchet mechanism permits motion of the input handle in one direction but restrains the handle against movement in the reverse direction. In the prior art approach, the entire reaction force generated in the wrench is imposed on the ratchet mechanism. In order to release the wrench from the nut or bolt, the operator must reapply the full torque load to the input or operating handle of the wrench to disengage the ratchet mechanism. While holding the wrench operating handle and resisting the full reaction load of the wrench, the operator must then release the ratchet mechanism to permit reverse rotation of the input handle, and the operator must then resist the full reaction load of the wrench while gradually permitting the handle to rotate in the reverse direction until the reaction load is dissipated. This unloading sequence requires the operator to resist the reaction load with just one hand while releasing the ratchet. Also, depending on the relative position of the operator with respect to the handle as the handle is rotated to relax the reaction load, it can become extremely difficult for the operator to maintain his grip on the handle and resist the reaction load. Furthermore, there is the danger at any time that, if the operator should let go of the handle for any reason, the entire unrelaxed reaction load will be immediately released resulting in violent kick back of the input handle which poses a serious hazard to the operator. Many serious injuries, including broken arms and operators being thrown from elevated positions, have been experienced because of the hazards presented by wrenches of this type.

SUMMARY OF THE INVENTION

The present invention eliminates the kick back hazard in a torque wrench by providing a slip brake in series with a ratchet or other one way clutch mechanism. The one way clutch mechanism functions to permit the input torque to be delivered, with amplification, through the wrench to the output of the wrench while preventing the violent kick back when the operating handle is released. The one way clutch mechanism is connected in series with a slip brake. The braking load of the slip brake; i.e., the force necessary to slip the brake, is set to exceed the maximum expected output of the torque wrench. When it is desired to relax the reaction load of the wrench and remove the wrench from the element being torqued, the operator merely loads the input handle in the direction opposite to the direction in which the torque was previously applied. The one way clutch mechanism is locked against movement in the opposite direction, so the reverse load on the operating handle is transmitted to the slip brake. When the operator applies sufficient force to the operating handle to overcome the braking load of the slip brake, slippage occurs which permits reverse rotation of the mechanical elements of the wrench, thereby relaxing the reaction load on the wrench elements. When the reaction load has been totally eliminated in this manner, the wrench can simply be removed from the element being fastened.

It is particularly important to note that with the use of the slip brake of the present invention the previous hazard of kick back is entirely eliminated. First, and most important of all, the slip brake will always prevent reverse rotation of the input handle unless the operator applies sufficient force in the reverse direction to overcome the load of the slip brake. Thus, should the operator ever let go of the operating handle for any reason whatsoever, whether during the course of applying torque load or relaxing the torque load, the input handle will remain stationary. Accordingly, the danger of kick back is eliminated. Also, the operator is freed from the particularly awkward and hazardous requirement of having to resist the full reaction load with one hand on the handle while releasing the ratchet for load relaxation. In the configuration of the present invention, no release of the ratchet is required. The operator merely delivers a positive force in the reverse direction to the operating handle to relax the reaction load. A particularly important feature to be noted in the present invention is that no reverse movement of the operating handle occurs unless and until the operator intentionally loads the operating handle in the reverse direction in an amount sufficient to overcome the braking load of the slip brake.

In order to achieve maximum utility for the wrench of the present invention, the one way clutch mechanism is preferably a reversible mechanism, so that the wrench can be used for either tightening or loosening a fastening element. Also, provision is made to adjust the braking load of the slip brake so that the slip point of the slip brake can be set just slightly higher than the torque load on the fastening element. This adjustment feature makes it possible to set the braking load of the slip brake below the maximum potential output of the wrench, so that the load which the operator has to overcome for reversing the operation is no higher than necessary.

Accordingly, one object of the present invention is to provide a novel and improved torque wrench which reduces kick back hazards.

Another object of the present invention is to provide a novel and improved torque wrench is easier and safer for the operator to use.

Yet another object of the present invention is to provide a novel adjustable slip brake which can be easily assembled and disassembled and which can be adjusted to compensate for wear resulting from continued use.

Still another object of the present invention is to provide a novel and improved torque wrench having a one way clutch and a slip brake in series to achieve safer operation by eliminating or reducing the hazard of kick back.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
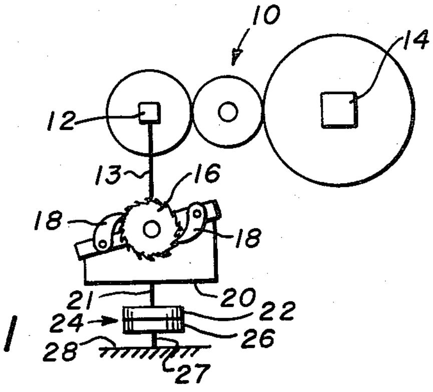
FIG. 1 is a schematic representation of the present invention.

Referring to FIG. 1, a generalized schematic of the torque wrench of the present invention is shown. The wrench has a gear train, indicated generally at 10, with an input socket 12 and an output socket 14. Input socket 12 receives an operating handle (see FIGS. 2 and 3), and output socket 14 houses a mating bar which has an adaptor head for engaging the element to be torqued, as is well known in the art. Input socket 12 is directly connected through a shaft or other mechanical connection 13 to drive a ratchet wheel 16 which is engaged by pawls 18 to permit free-wheeling movement in one direction and prevent movement in the reverse direction so as to form a one way clutch in a well known manner. Pawls 18 are mounted on a base or platform 20 which is, in turn, directly connected by a shaft or other mechanical connection 21 to a disc 22 of a slip brake which has been indicated generally at 24. A second disc 26 of slip brake 24 is grounded, by a mechanical connection 27, i.e., connected to a firm base 28, which in this situation would be the casing which houses the elements 10–26 of the torque wrench.

In operation of the configuration shown schematically in FIG. 1, an input handle connected to input socket 12 would, when rotated in one direction, for example clockwise, cause delivery of an output torque to output socket 14. The output torque would be multiplied relative to the input torque delivered by the operator to the handle as determined by the ratio of gear train 10. As the input handle is rotated in the clockwise direction, ratchet wheel 16 will also rotate in the clockwise direction and displace pawls 18 so that the ratchet wheel is free-wheeling and prevents no restraint or impediment to the torquing operation. As the output torque increases in response to continued input by the operator, an equal and opposite reaction load is imposed on the elements of the wrench which tries to drive the operating handle in the reverse, i.e., counterclockwise, direction. Pawls 18 engage the teeth of ratchet wheel 16 to prevent any drive back through the system and hence prevent counterclockwise rotation of input socket 12 and kick back of the operating handle. Thus, the reaction load is imposed on ratchet 16 and pawls 18. This reaction load is transferred through pawls 18 and platform 20 to disc 22 of slip brake 24. Thus, a force is imposed on disc 22 which tries to rotate, i.e., slip, disc 22 relative to disc 26. However, disc 26 is loaded against disc 22 with a sufficient load to prevent any slippage between the discs. This loading may be accomplished by springs or any other known slip brake loading mechanisms. Thus, the ratchet mechanism and the slip brake combine in series to prevent reverse rotation of the input or operating handle when the wrench is carrying a reaction torque load.

When it is desired to relax the reaction torque load and remove the wrench from the work; i.e., the fastener element being torqued; the operator manually imposes a load on the operating handle in the opposite (counterclockwise) direction, i.e., the direction opposite to the direction of rotation for torquing. This reverse force applied by the operator is delivered directly from input socket 12 to ratchet wheel 16. Since ratchet wheel 16 is restrained against rotation of the counterclockwise direction by pawls 18, this counterclockwise force is delivered to platform 20 and then directly to brake disc 22 to urge disc 22 in the counterclockwise direction. When sufficient force is delivered to disc 22 to overcome the load of the slip brake, disc 22 will rotate counterclockwise relative to disc 26. The operator merely continues this counterclockwise rotation of the operating handle until sufficient reverse rotation of the wrench element has occurred to reduce the wrench reaction load to zero thus freeing the wrench from the work. The operator then simply removes the wrench from the fastening element. If the torque wrench is equipped with a torque gauge for readout, the gauge will read "0" when all of the reaction forces have been relaxed.

Since slip brake 24 prevents reverse rotation of the operating handle until a positive reverse force is applied by the operator to the input handle to overcome the slip brake, the danger of kick back or sudden unwinding of the input handle, which was a continuing and serious hazard in the prior art, is eliminated. No reverse rotation occurs unless and until the operator applies a reverse force to the input socket via the operating handle, and reverse rotation of the operating handle automatically terminates in the event the operator releases the operating handle for any reason whatsoever.

Figure 2:
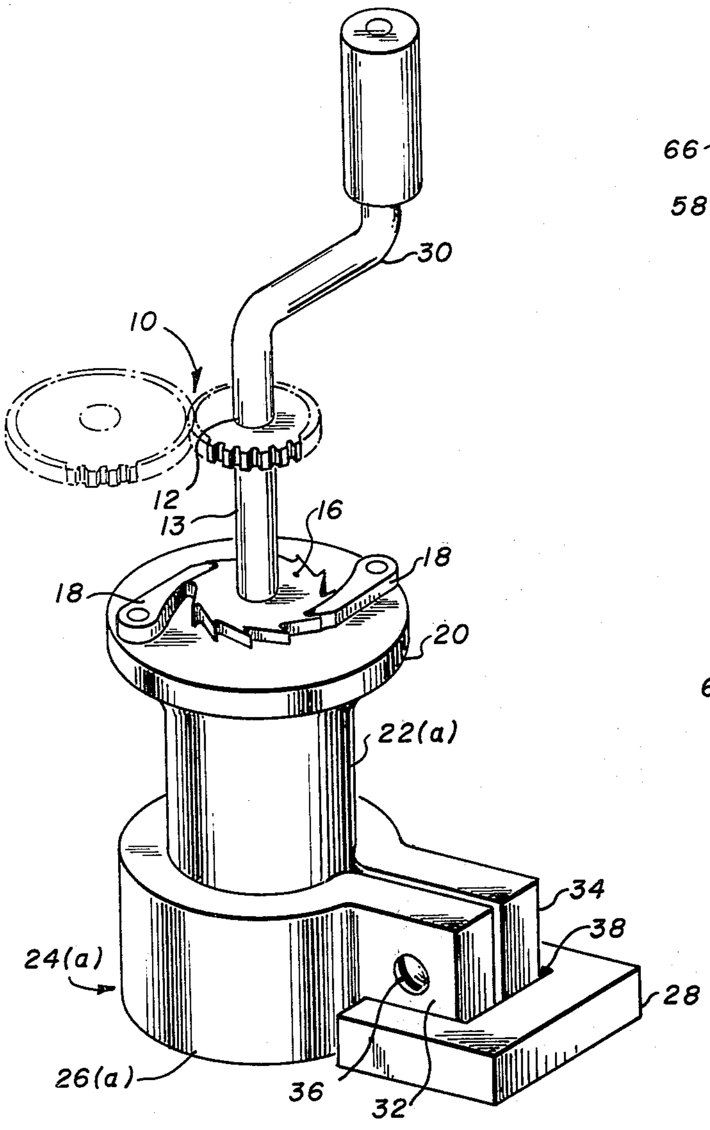
FIG. 2 is a schematic illustration of a first embodiment of the present invention.

Referring now to FIG. 2, a simplified version of one possible embodiment of the present invention is shown. Input handle 30 is connected by input socket 12 to drive gear train 10 which, in turn, drives the output socket (not shown). Input socket 12 is also connected by shaft 13, to drive ratchet wheel 16 which cooperates with pawls 18 to form a one way clutch. Pawls 18 are pivotally mounted on platform 20, and ratchet wheel 16 is rotatively mounted on platform 20. Ratchet wheel 16 and pawls 18 are mounted so that the ratchet wheel is free-wheeling when moved in the clockwise direction by handle 30, but pawls 18 will engage the teeth of ratchet wheel 16 to prevent counterclockwise rotation of the ratchet wheel relative to the pawls. Platform 20 is rigidly mounted on a rotatable shaft 22(*a*), which constitutes one disc of a slip brake 24 (*a*). A split ring 26(*a*) surrounds shaft 22(*a*) and forms the second disc of slip brake 24(*a*). A pair of flanges 32 and 34 project from each half of split ring 26(*a*) in the vicinity of the split, and an adjustable screw 36 extends through flanges 32 and 34. Screw 36 serves the function of imposing an adjustable load on slip brake 24(*a*) by either bringing the split ends of ring 26(*a*) closer together or spreading them apart. In this manner, the load which has to be overcome to slip the brake may be set as desired. One or both of the flanges 32 and 34 are retained in a locking slot 38 on a portion 28 of the frame of the tool so that slip brake ring 26(*a*) is grounded to the casing of the torque wrench.

As described above with regard to the operation of the schematic of FIG. 1, clockwise rotation of handle 30 by the operator results in operation of the gear train to generate an output from the torque wrench to tighten a fastening element to which the output socket of the wrench is connected. Kick back at any other counterclockwise rotation is prevented by the one way clutch of ratchet wheel 16 and pawls 18 and the load of slip brake 24(*a*) in series with the one way clutch. When the desired torque level of the fastener element has been achieved and the operator desires to reduce the wrench reaction load to free the wrench from the fastener, he can do so in a simple manner without danger of kick back or sudden unwinding of the input crank handle. The operator merely applies a counterclockwise force to operating handle 30. That counterclockwise force is delivered through ratchet wheel 16 to pawls 18, and then to platform 20 on which pawls 18 are mounted. The force is then delivered to slip brake element 22(*a*) which slips relative to slip brake element 26(*a*) when the loading of the slip brake is overcome.

With regard to both the schematic of FIG. 1 and the simplified embodiment shown on FIG. 2, the wrench can be made to either tighten or fasten the element or loosen a fastening element simply by substituting for ratchet wheel 16 and pawls 18 any well known one way clutch mechanism which can be selectively made to operate in one direction or the other.

Figure 3:
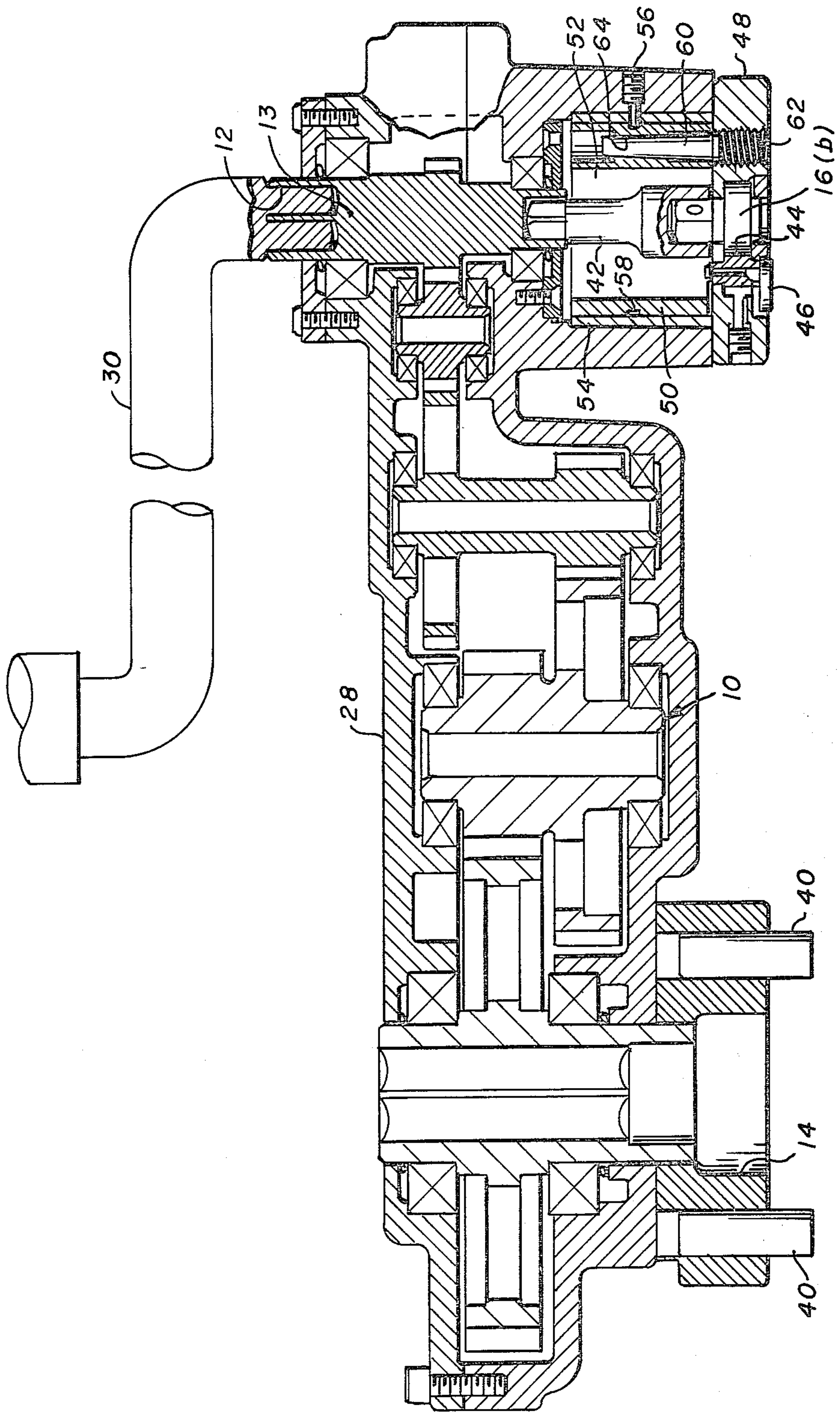
FIG. 3 is a sectional elevation view of the presently preferred embodiment of the present invention.

Referring now to FIG. 3, the presently preferred embodiment of the present invention is shown. Wrench casing 28 houses gear train 10 which extends from input socket 12 and shaft 13 to output socket 14. Output socket 14 is adapted to receive a shaft and a socket element sized to develop a fastening element which torque is to be applied for either tightening or loosening. Actuating handle 30 is positioned in input socket 12, and a pair of pins 40 project from the lower part of casing 28 to fit into a grounding adapter to ground the wrench casing in a manner well known in the art. An extension 42 is mated to rotating shaft 13 to rotate with shaft 13. A ratchet wheel 16(*b*) is mated to shaft 42 to rotate with shaft 42, such as by a "snap-on" connection. Ratchet wheel 16(*b*) interacts with two way pawl element 44 which is operated by selector lever 46 to determine the direction in which the ratchet wheel will be free running or locked. Two way pawl element 44 is maintained in its selected position by a spring loaded ball mechanism. Depending on the position of selector lever 46, the ratchet may be free running in either the clockwise or counterclockwise direction and locked in the opposite direction, thus, constituting a one way clutch which is reversible in direction. The entire ratchet mechanism may be any commercially available two way ratchet mechanism which defines, in effect, a pair of one way, oppositely directed clutches depending on the selection of the pawl lever. The entire ratchet mechanism is mounted in an end plate 48 which is connected by screw fasteners to a split ring 50 located in a chamber 52 in casing 28.

Split ring 50, which is a steel element, engages by means of a friction fit a bronze sleeve 54 in chamber 52. Sleeve 54, in turn, firmly engages the wall of chamber 52 of casing 28 by a press fit so that the sleeve is fixed relative to casing 28. A retaining screw 56 passes through a mating hole in bronze sleeve 56 to also lock bronze sleeve 54 against both linear and rotational movement in casing 28. The end of retaining screw 56 also projects into an annular groove 58 in split ring 50 to prevent linear movement of the split ring relative to the axis of shaft 42 while permitting circumferential or tangential motion of split ring 50. Split ring 50 and bronze sleeve 54 constitute the two discs or slip surfaces of a slip brake. A tapered pin 60, the end 62 of which is threaded into a threaded opening in plate 48, extends into a tapered portion 64 of a passageway in split ring 50, so that the gripping load between split ring 50 and bronze sleeve 54 can be adjusted to exceed the desired output torque of the wrench. The opposite ends of the passageway in ring 50, which communicate with the tapered portion 64 are unthreaded and are counterbored as shown.

Figure 5:
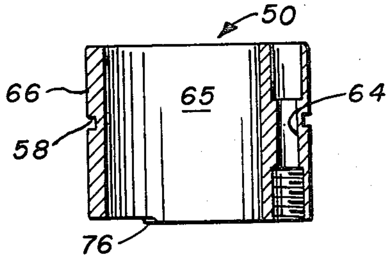
FIG. 5 is a view along line 5—5 of FIG. 4.
Figure 4:
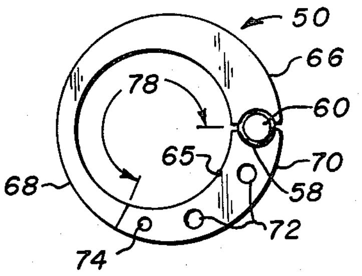
FIG. 4 is a view showing a detail of the embodiment of the present invention depicted in FIG. 3.

Referring now to FIGS. 4 and 5, some of the details of split ring 50 can be seen. FIG. 4 is a view looking at the end of sleeve 50 as it would be seen with end plate 48 removed. The inner surface 65 of split ring 50 is eccentric relative to outer surface 66, so that split ring 50 varies in thickness from a thin section 68 to a diametrically opposed thick section 70. Ring 50 is split at its thickest part, and tapered groove 58 and tapered pin 60 are located in thick section 70. The fact that the thinnest portion 68 of split ring 50 is diametrically opposite to the location of the split facilitates the flexing or expansion of split ring 50 when tapered pin 60 is advanced into tapered groove 58 to spread the two halves of the tapered ring to increase the load of the slip brake. End plate 48 is secured to split ring 50 by a pair of screws which extend through end plate 48 and engage apetures 72 in split ring 50. A locating dowel also extends from end plate 48 into a locating hole 74 in split ring 50 to locate the end plate.

As can best be seen from a combined consideration of FIGS. 4 and 5, the bottom of split ring 50 is undercut or relieved at 76, this undercut or relief extending over the major portion of the lower surface indicated by the arc marked 78. This undercut also facilitates the flexing of the split ring in response to changes in location of tapered pin 60.

In the operation of the wrench of FIGS. 3, 4 and 5, rotation of input handle 30 in one direction, e.g., clockwise, will result in an output at output socket 14 to tighten a fastening element. The selector lever 46 of the pawl and ratchet mechanism is positioned to permit the ratchet to free-wheel in the clockwise direction in this mode of operation. As the fastening element is subjected to an increasing torque load, an equal and opposite reaction force builds through the gear train 10 back to shaft 13 and shaft 42, but the operation of the serially connected ratchet mechanism and the slip brake comprising split ring 50 and bronze sleeve 54 prevent and kick back or counterclockwise rotation of shafts 42 and 13 and input handle 30. Tapered pin 60 is positioned in its groove so as to provide an appropriate loading of split ring 50 against grounded bronze sleeve 54 which is slightly greater than the maximum torque to be developed by the wrench.

When torquing of the fastening element has been completed and it is desired to remove the wrench from the fastening element, the operator merely reverses the direction of force applied to input handle 30, i.e., he urges input handle 30 in the counterclockwise direction. The counterclockwise force on input handle 30 is transmitted via shaft 13 and shaft 42 to ratchet wheel 16(*b*). Since pawl 44 engages the teeth of the ratchet wheel 16(*b*) to prevent relative counterclockwise motion of the ratchet wheel with respect to pawl 44, the counterclockwise force is transmitted through pawl 44 to end plate 48 in which the pawl is mounted. When the bias load between split ring 50 and bronze sleeve 54 is exceeded, end plate 48 and split ring 50 will rotate, i.e., slip, relative to bronze sleeve 54 in counterclockwise direction, thus permitting relaxation of the reaction force in the wrench. Wrenches of this type are usually provided with an output gauge to the torque load, and when the output gauge reads "0" the operator is thereby informed that he can remove the wrench from the fastening element. If no readout device is provided, the operator can still, by tactile feel, sense the total relaxation of the torquing load.

The one caution which must be observed by the operator of the wrench of the present invention is that the ratchet lever or other control mechanism for the one way clutch must not be reversed while the wrench is in a torqued state. If that were to be done, the restraint of the one way clutch would be lost, and an immediate and severe kick back would be encountered.

From the foregoing description it should be seen that the series arrangement of a one way clutch and a slip brake results in a torque wrench which is both considerably easier and considerably safer to operate. The operator can operate the wrench in the torquing direction without fear of kick back during the torquing operation. When torquing has been completed and the operator desires to remove the wrench from the fastening element, relaxation of the reaction torque load is accomplished conveniently and safely merely by reversing the directional rotation of the input handle to overcome the load of the slip brake.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A torque wrench including:
- a casing;
- torque transmission means in said casing;
- input means connected to said transmission means for delivering an input force to said transmission means in response to movement of said input means in a first direction;
- output means connected to said transmission means for imposing a torque load on an element to be torqued;
- one way clutch means coupled to said input means to prevent reaction forces in said wrench from acting on said input means to cause undesired movement of said input means in a direction opposite to said first direction; and
- slip brake means connected to said one way clutch means and in series with said one way clutch means, said slip brake means being responsive to a predetermined load on said input means in a direction opposite to said first direction to relax the reaction forces in said wrench.

2. A torque wrench as in claim 1 wherein said slip brake means includes:
- a first slip element connected to said one way clutch means; and
- a second slip element grounded to said casing, said first slip element being loaded against and movable relative to said second slip element in response to a predetermined force.

3. A torque wrench as in claim 2 wherein said slip brake means further includes:
- means for varying the load between said first slip element and said second slip element to vary the force at which said first slip element moves relative to said second slip element.

4. A torque wrench including:
- a casing;
- gear train means in said casing for transmission of torque;
- rotatable input means connected to said gear train means for delivering an input force to said gear train means in response to rotation of said input means in a first direction;
- rotatable output means connected to said gear train means for delivering an output torque in a first direction to an element to be torqued;
- one way clutch means coupled to said input means to prevent reaction forces in said wrench from adting on said input means to rotate said input means in a direction opposite to said first direction thereof; and
- slip brake means coupled to said one way clutch means and in series with said one way clutch means, said slip brake means having a first slip element connected to said casing and a second slip element coupled to said one way clutch means, said second slip element loaded against said first slip element and being rotatable relative to said first slip element in response to a predetermined force on said input means in a direction opposite to said first direction thereof to relax the reaction forces in said wrench.

5. A torque wrench as in claim 4 including:
- means to vary the load between said brake means second slip element and said first slip element.

6. A torque wrench including:
- a casing;
- gear train means in said casing for transmission of torque;
- rotatable input means connected to said gear train means for delivering an input force to said gear train means in responsive to rotation of said input means in a first direction;
- rotatable output means connected to said gear train means for delivering an output torque in a first direction to an element to be torqued;
- one way clutch means coupled to said input means to prevent reaction forces in said wrench from acting on said input means to rotate said input means in a direction opposite to said first direction; and
- slip brake means coupled to said one way clutch means and in series with said one way clutch means, said slip brake means having a first slip element connected to said casing and a second slip element coupled to said one way clutch means, said second slip element comprising a split ring, said split ring being loaded against said first slip element and being rotatable relative to said first slip element in response to a predetermined force on said input means in a direction opposite to said first direction to relax the reaction forces in said wrench.

7. A torque wrench as in claim 6 wherein:
- said second slip element has an outer surface concentric with and in contact with an inner surface of said first slip element and an inner surface eccentric with respect to said outer surface, whereby said second slip element varies in thickness from a thin section to a thick section.

8. A torque wrench as in claim 7 including:

adjustable means positioned in said thick section to vary the load between said second slip element and said first slip element.

9. A torque wrench as in claim 8 wherein:

said adjustable means includes a tapered pin positioned in a tapered hole in said thick section.

10. A torque wrench in claim 9 wherein:

said one way clutch means includes ratchet means connected to said input means and pawl means coupled to said second slip element;

said ratchet means and pawl means being retained in an end plate connected to said second slip element.

11. A torque wrench as in claim 9 wherein:

said first and second slip elements are of dissimilar materials.

12. A torque wrench including:

a casing;

torque transmission means in said casing;

input means connected to said transmission means for delivering an input force to said transmission means in response to movement of said input means in a first direction;

output means connected to said transmission means for imposing a torque load on an element to be torqued;

reversible one way clutch means coupled to said input means to prevent reaction forces in said wrench from acting on said input means to cause undesired movement of said input means in a direction opposite to said first direction; and slip brake means connected to said one way clutch means and in series with said one way clutch means, said slip brake means being responsive to a predetermined load on said input means in a direction opposite to said first direction to relax the reaction forces in said wrench.

13. A torque wrench including:

a casing;

gear train means in said casing for transmission of torque;

rotatable input means connected to said gear train means for delivering an input force to said gear train means in response to rotation of said input means in a first direction;

rotatable output means connected to said gear train means for delivering an output torque in a first direction to an element to be torqued;

reversible one way clutch means coupled to said input means to prevent reaction forces in said wrench from acting on said input means to rotate said input means in a direction opposite to said first direction; and slip brake means coupled to said one way clutch means and in series with said one way clutch means, said slip brake means having a first slip element connected to said casing and a second slip element loaded against said first slip element and being rotatable relative to said first slip element in response to a predetermined force on said input means in a direction opposite to said first direction to relax the reaction forces in said wrench.

* * * * *